(12) United States Patent
Feng

(10) Patent No.: US 12,429,924 B2
(45) Date of Patent: *Sep. 30, 2025

(54) HINGE, DISPLAY PANEL, AND ELECTRONIC DEVICE

(71) Applicant: Wuhan China Star Optoelectronics Semiconductor Display Technology Co., Ltd., Wuhan (CN)

(72) Inventor: Zikang Feng, Wuhan (CN)

(73) Assignee: WUHAN CHINA STAR OPTOELECTRONICS SEMICONDUCTOR DISPLAY TECHNOLOGY CO., LTD., Wuhan (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/622,125

(22) PCT Filed: Dec. 15, 2021

(86) PCT No.: PCT/CN2021/138166
§ 371 (c)(1),
(2) Date: Dec. 22, 2021

(87) PCT Pub. No.: WO2023/092730
PCT Pub. Date: Jun. 1, 2023

(65) Prior Publication Data
US 2024/0427384 A1 Dec. 26, 2024

(30) Foreign Application Priority Data
Nov. 25, 2021 (CN) .......................... 202111409001.8

(51) Int. Cl.
*G06F 1/16* (2006.01)
(52) U.S. Cl.
CPC .......... *G06F 1/1681* (2013.01); *G06F 1/1652* (2013.01)

(58) Field of Classification Search
None
See application file for complete search history.

(56) References Cited

U.S. PATENT DOCUMENTS 9,348,450 B1 5/2016 Kim
10,551,880 B1 * 2/2020 Ai .......................... G06F 1/1641
(Continued)

FOREIGN PATENT DOCUMENTS

CN 105830140 A 8/2016
CN 107135288 A 9/2017
(Continued)

OTHER PUBLICATIONS

International Search Report in International application No. PCT/CN2021/138166,mailed on Apr. 26, 2022.
(Continued)

*Primary Examiner* — Imani N Hayman
*Assistant Examiner* — Rashen E Morrison
(74) *Attorney, Agent, or Firm* — Nathan & Associates Patent Agents Ltd.; Menachem Nathan

(57) ABSTRACT

A hinge, a display panel, and an electronic device are provided. The display panel includes a flexible display panel body and the hinge. The flexible display panel body includes a flexible portion, a first portion, and a second portion. The hinge includes a fixed bracket, a support mechanism, and a rotary mechanism. The support mechanism includes a first support member, a second support member, a third support member, and a fourth support member. The rotary mechanism includes a first connection member, a second connection member, a third connection member, and a fourth connection member.

20 Claims, 6 Drawing Sheets

(56) References Cited

U.S. PATENT DOCUMENTS

| | | | | |
|---|---|---|---|---|
| 11,644,874 B2* | 5/2023 | Kuramochi | ........... | G06F 1/1681 |
| | | | | 361/679.27 |
| 11,762,430 B2* | 9/2023 | Kim | ...................... | G06F 1/1616 |
| | | | | 361/679.27 |
| 11,825,620 B2* | 11/2023 | Zhao | .................... | H05K 5/0226 |
| 11,917,780 B2* | 2/2024 | Caplow-Munro | ... | H05K 5/0017 |
| 11,924,987 B2* | 3/2024 | Lee | ........................... | G06F 1/16 |
| 11,994,161 B2* | 5/2024 | Liu | ...................... | H05K 5/0226 |
| 2015/0366089 A1* | 12/2015 | Park | .................... | H04M 1/0268 |
| | | | | 361/679.01 |
| 2017/0199549 A1 | 7/2017 | Yeom | | |
| 2017/0303414 A1 | 10/2017 | Chu | | |
| 2018/0270964 A1 | 9/2018 | Fan et al. | | |
| 2021/0081007 A1* | 3/2021 | Jan | ........................ | G06F 1/1681 |

FOREIGN PATENT DOCUMENTS

| | | |
|---|---|---|
| CN | 108399861 A | 8/2018 |
| CN | 110741426 A | 1/2020 |
| CN | 111421835 A | 7/2020 |
| CN | 111510536 A | 8/2020 |
| CN | 112154496 A | 12/2020 |
| CN | 212229972 U | 12/2020 |
| CN | 112751961 A | 5/2021 |
| CN | 113280033 A | 8/2021 |
| CN | 113299195 A | 8/2021 |
| CN | 113314037 A | 8/2021 |
| CN | 113404770 A | 9/2021 |
| WO | 2015163272 A1 | 10/2015 |
| WO | 2018014531 A1 | 1/2018 |

OTHER PUBLICATIONS

Written Opinion of the International Search Authority in International application No. PCT/CN2021/138166, mailed on Apr. 26, 2022.

Chinese Office Action issued in corresponding Chinese Patent Application No. 202111409001.8 dated Apr. 26, 2023, pp. 1-10.

* cited by examiner

HINGE, DISPLAY PANEL, AND ELECTRONIC DEVICE

FIELD OF INVENTION

The present disclosure relates to the display field, and in particular, to a hinge, a display panel, and an electronic device.

BACKGROUND OF INVENTION

With the development of flexible organic light-emitting diode (OLED) display technologies, foldable electronic devices have both the advantages of portability of ordinary electronic devices and an amazing experience of large-screen displays after unfolding. Therefore, foldable electronic devices have gradually become an important trend in the development of mobile terminals, and have become an important arena of competition among major terminal manufacturers.

Currently, a flexible screen of a foldable electronic device is continuously foldable. To ensure that the flexible screen is not pulled or squeezed before and after folding, the foldable electronic device usually requires a mechanism designed to make room to accommodate the flexible screen after bending. Therefore, how to match the surface of the mechanism with the size of the flexible screen before and after the foldable display device is folded is an urgent problem to be resolved for existing foldable electronic device.

SUMMARY OF INVENTION

Technical Problem

Embodiments of the present disclosure provide a hinge, a display panel, and an electronic device, to resolve the deficiency in the related technologies.

Technical Solution

To achieve the foregoing objective, technical solutions provided in the embodiments of the present disclosure are as follows:

A display panel is provided, including:
a flexible display panel body, including a flexible portion, and a first portion and a second portion connected to opposite sides of the flexible portion; and
a hinge, including a fixed bracket, a support mechanism, and a rotary mechanism, wherein the support mechanism includes a first support member, a second support member, a third support member, and a fourth support member, the rotary mechanism includes a first connection member, a second connection member, a third connection member, and a fourth connection member, the first connection member is rotatably connected to one side of the fixed bracket along a first shaft, the second connection member is rotatably connected to one side of the fixed bracket away from the first connection member along a second shaft, the first support member is rotatably connected to the first connection member, the second support member is arranged between the first connection member and the first support member, one end of the second support member is rotatably connected to the first support member, the other end of the second support member is slidably connected to the first connection member, one end of the third connection member is rotatably connected to the fixed bracket along a third shaft, the other end of the third connection member is slidably connected to the first support member, the third support member is rotatably connected to the second connection member, the fourth support member is arranged between the second connection member and the third support member, one end of the fourth support member is rotatably connected to the third support member, the other end of the fourth support member is slidably connected to the second connection member, one end of the fourth connection member is rotatably connected to the fixed bracket along a fourth shaft, and the other end of the fourth connection member is slidably connected to the third support member.

When the support mechanism is in a fully folded state, the flexible portion is in a bent state, the second support member and the fourth support member are arranged opposite to each other and respectively support opposite ends of the flexible portion, the first support member and the third support member are arranged opposite to each other and respectively support the first portion and the second portion, the first connection member and the second connection member are arranged opposite to each other and are respectively parallel and coplanar with the second support member and the fourth support member, a first angle is formed between the opposite ends of the flexible portion, a second angle is formed between the first portion and the second portion, and the first angle is greater than the second angle.

The embodiments of the present disclosure further provide an electronic device, including a display panel, the display panel including:
a flexible display panel body, including a flexible portion, and a first portion and a second portion connected to opposite sides of the flexible portion; and
a hinge, including a fixed bracket, a support mechanism, and a rotary mechanism, wherein the support mechanism includes a first support member, a second support member, a third support member, and a fourth support member, the rotary mechanism includes a first connection member, a second connection member, a third connection member, and a fourth connection member, the first connection member is rotatably connected to one side of the fixed bracket along a first shaft, the second connection member is rotatably connected to one side of the fixed bracket away from the first connection member along a second shaft, the first support member is rotatably connected to the first connection member, the second support member is arranged between the first connection member and the first support member, one end of the second support member is rotatably connected to the first support member, the other end of the second support member is slidably connected to the first connection member, one end of the third connection member is rotatably connected to the fixed bracket along a third shaft, the other end of the third connection member is slidably connected to the first support member, the third support member is rotatably connected to the second connection member, the fourth support member is arranged between the second connection member and the third support member, one end of the fourth support member is rotatably connected to the third support member, the other end of the fourth support member is slidably connected to the second connection member, one end of the fourth connection member is rotatably connected to the fixed bracket along a fourth shaft, and the other end of the fourth connection member is slidably connected to the third support member.

When the support mechanism is in a fully folded state, the flexible portion is in a bent state, the second support member and the fourth support member are arranged opposite to each other and respectively support opposite ends of the flexible portion, the first support member and the third support member are arranged opposite to each other and respectively support the first portion and the second portion, the first connection member and the second connection member are arranged opposite to each other and are respectively parallel and coplanar with the second support member and the fourth support member, a first angle is formed between the opposite ends of the flexible portion, a second angle is formed between the first portion and the second portion, and the first angle is greater than the second angle.

The embodiments of the present disclosure further provide a hinge, including:

a fixed bracket, a support mechanism, and a rotary mechanism, wherein the support mechanism includes a first support member, a second support member, a third support member and a fourth support member, the rotary mechanism includes a first connection member, a second connection member, a third connection member, and a fourth connection member, the first connection member is rotatably connected to one side of the fixed bracket along a first shaft, the second connection member is rotatably connected to one side of the fixed bracket away from the first connection member along a second shaft, the first support member is rotatably connected to the first connection member, the second support member is arranged between the first connection member and the first support member, one end of the second support member is rotatably connected to the first support member, the other end of the second support member is slidably connected to the first connection member, one end of the third connection member is rotatably connected to the fixed bracket along a third shaft, the other end of the third connection member is slidably connected to the first support member, the third support member is rotatably connected to the second connection member, the fourth support member is arranged between the second connection member and the third support member, one end of the fourth support member is rotatably connected to the third support member, the other end of the fourth support member is slidably connected to the second connection member, one end of the fourth connection member is rotatably connected to the fixed bracket along a fourth shaft, and the other end of the fourth connection member is slidably connected to the third support member.

When the support mechanism is in a fully folded state, the second support member and the fourth support member are arranged opposite to each other, the first support member and the third support member are arranged opposite to each other, the first connection member and the second connection member are arranged opposite to each other and are respectively parallel and coplanar with the second support member and the fourth support member, a first angle is formed between the second support member and the fourth support member, a second angle is formed between the first support member and the second support member, and the second angle is less than the first angle.

Beneficial Effects

The embodiments of the present disclosure provide a display panel, including a flexible display panel body, including a flexible portion, and a first portion and a second portion connected to opposite sides of the flexible portion; and a hinge, including a fixed bracket, a support mechanism, and a rotary mechanism. The rotary mechanism includes a first connection member rotatably connected to one side of the fixed bracket, and a second connection member rotatably connected to one side of the fixed bracket away from the first connection member. The support mechanism includes a first support member rotatably connected to the first connection member; a second support member arranged between the first connection member and the first support member, wherein one end of the second support member is rotatably connected to the first support member, and the other end of the second support member is slidably connected to the first connection member; a third support member rotatably connected to the second connection member; and a fourth support member arranged between the second connection member and the third support member, wherein one end of the fourth support member is rotatably connected to the third support member, and the other end of the fourth support member is slidably connected to the second connection member. The rotary mechanism further includes a third connection member and a fourth connection member, one end of the third connection member is rotatably connected to the fixed bracket along a third shaft, the other end of the third connection member is slidably connected to the first support member, one end of the fourth connection member is rotatably connected to the fixed bracket along a fourth shaft, and the other end of the fourth connection member is slidably connected to the third support member. In the embodiments of the present disclosure, through the connection relationships between the above parts, when the support mechanism is in a fully folded state, the flexible portion is in a bent state, the second support member and the fourth support member are arranged opposite to each other and respectively support opposite ends of the flexible portion, the first support member and the third support member are arranged opposite to each other and respectively support the first portion and the second portion, the first connection member and the second connection member are arranged opposite to each other and are respectively parallel and coplanar with the second support member and the fourth support member, a first angle is formed between the opposite ends of the flexible portion, a second angle is formed between the first portion and the second portion, and the first angle is greater than the second angle. Therefore, the room for accommodating the flexible display panel body is increased, so that when the flexible display panel body is in the fully folded state, a larger arc for bending can be adopted, which improves the folding of the flexible display panel body and avoids causing damage to the flexible display panel body due to excessively small folding.

BRIEF DESCRIPTION OF DRAWINGS

The following describes specific implementations of the present disclosure in detail with reference to the accompanying drawings, to make the technical solutions and other beneficial effects of the present disclosure obvious.

DETAILED DESCRIPTION OF PREFERRED EMBODIMENTS

Figure 1:
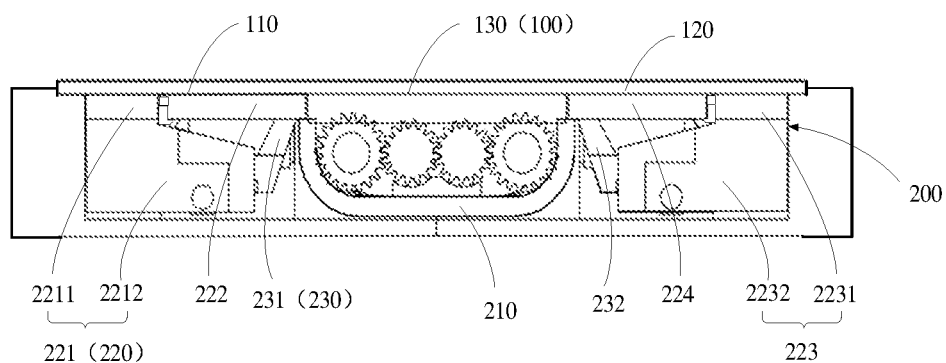
FIG. 1 is a schematic diagram of a display panel in an unfolded state according to an embodiment of the present disclosure.

The present disclosure provides a hinge, a display panel, and an electronic device. In order to make the objective, technical solution, and effect of the present disclosure clearer, the present disclosure is further described in detail below with reference to the accompanying drawings and embodiments. It should be understood that the specific embodiments described herein are merely used for illustrating the present disclosure rather than limiting the present disclosure.

Referring to FIG. 1 to FIG. 10, the embodiments of the present disclosure provide a display panel 10, including a flexible display panel body 100, including a flexible portion 130, and a first portion 110 and a second portion 120 connected to opposite sides of the flexible portion 130; and a hinge 200, including a fixed bracket 210, a support mechanism 220, and a rotary mechanism 230. The rotary mechanism 230 includes a first connection member 231 rotatably connected to one side of the fixed bracket 210, and a second connection member 232 rotatably connected to one side of the fixed bracket 210 away from the first connection member 231. The support mechanism 220 includes a first support member 221 rotatably connected to the first connection member 231; a second support member 222 arranged between the first connection member 231 and the first support member 221, wherein one end of the second support member 222 is rotatably connected to the first support member 221, and the other end of the second support member 222 is slidably connected to the first connection member 231; a third support member 223 rotatably connected to the second connection member 232; and a fourth support member 224 arranged between the second connection member 232 and the third support member 223, wherein one end of the fourth support member 224 is rotatably connected to the third support member 223, and the other end of the fourth support member 224 is slidably connected to the second connection member 232. The rotary mechanism 230 further includes a third connection member 233 and a fourth connection member 234, one end of the third connection member 233 is rotatably connected to the fixed bracket 210 along a third shaft 235, the other end of the third connection member 233 is slidably connected to the first support member 221, one end of the fourth connection member 234 is rotatably connected to the fixed bracket 210 along a fourth shaft 236, and the other end of the fourth connection member 234 is slidably connected to the third support member 223.

In the embodiments of the present disclosure, through the connection relationships between the above parts, when the support mechanism 220 is in a fully folded state, the flexible portion 130 is in a bent state, the second support member 222 and the fourth support member 224 are arranged opposite to each other and respectively support opposite ends of the flexible portion 130, the first support member 221 and the third support member 223 are arranged opposite to each other and respectively support the first portion 110 and the second portion 120, the first connection member 231 and the second connection member 232 are arranged opposite to each other, the first connection member 231 is parallel and coplanar with the second support member 222, and the second connection member 232 is parallel and coplanar with the fourth support member 224. In a direction along the first support member 221 and the third support member 223 toward the fixed bracket 210, a distance between the second support member 222 and the fourth support member 224 gradually increases, so that a first angle is formed between the opposite ends of the flexible portion 130, the first angle is an acute angle, and a distance between the first support member 221 and the third support member 223 is less than or equal to the distance between the second support member 222 and the fourth support member 224, so that a second angle is formed between the first portion 110 and the second portion 120, and the second angle is an acute angle or a 0° angle. Because the second angle is less than the first angle, the room for accommodating the flexible display panel body 100 is increased, so that when the flexible display panel body 100 is in the fully folded state, a larger arc can be used for bending, which improves a folding condition of the flexible display panel body 100, and avoids causing damage to the flexible display panel body 100 due to excessively small folding.

The technical solutions of the present disclosure are described below with reference to specific embodiments.

Figure 2:
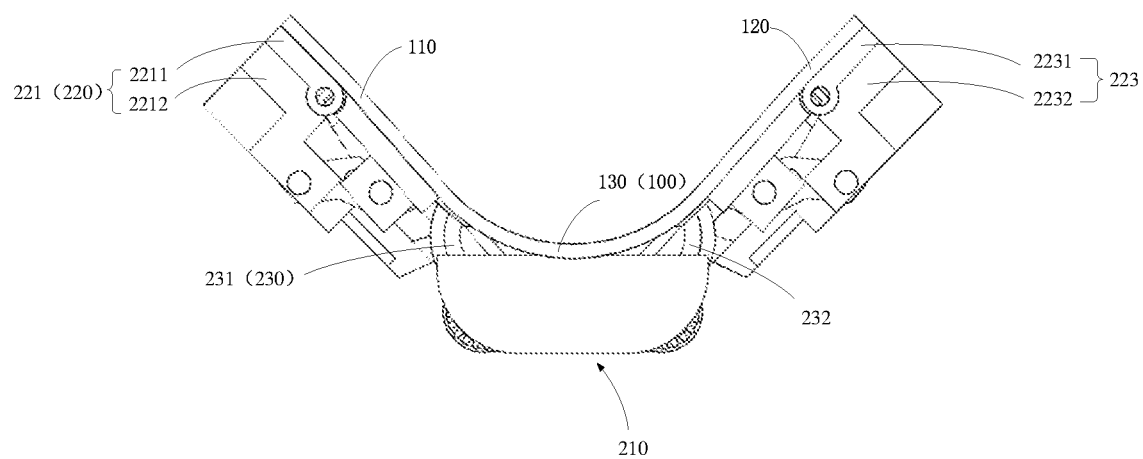
FIG. 2 is a schematic diagram of a display panel in a transitional folded state according to an embodiment of the present disclosure.
Figure 3:
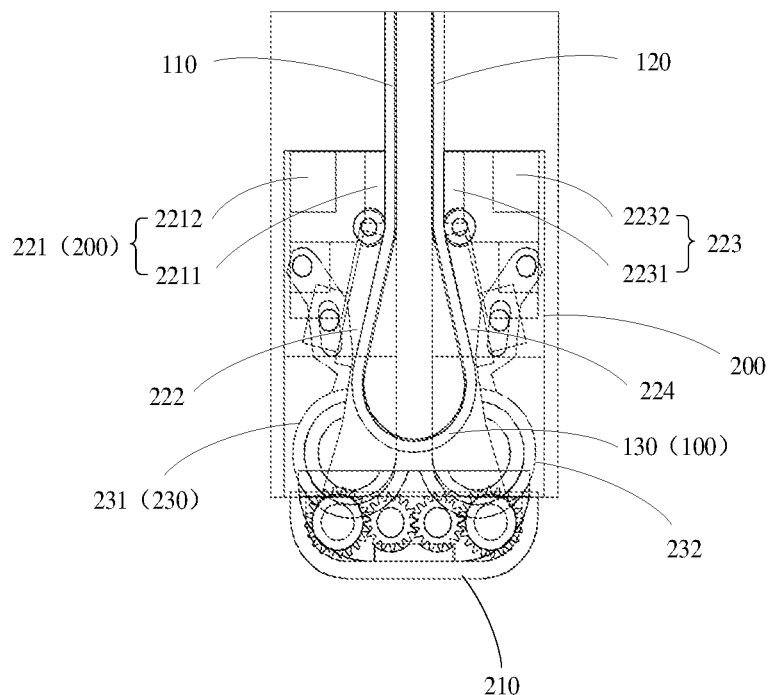
FIG. 3 is a schematic diagram of a display panel in a fully folded state according to an embodiment of the present disclosure.
Figure 4:
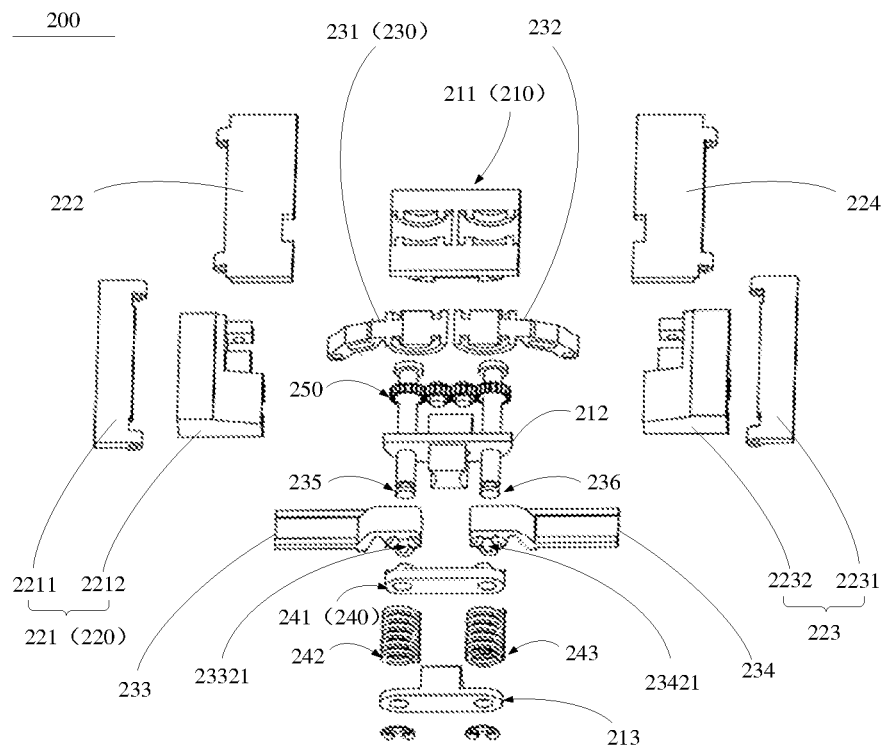
FIG. 4 is an exploded schematic diagram of a hinge of a display panel according to an embodiment of the present disclosure.

Referring to FIG. 1, FIG. 2, and FIG. 3, FIG. 1 is a schematic diagram of a display panel in an unfolded state according to an embodiment of the present disclosure; FIG. 2 is a schematic diagram of a display panel in a transitional folded state according to an embodiment of the present disclosure; and FIG. 3 is a schematic diagram of a display panel in a fully folded state according to an embodiment of the present disclosure.

This embodiment provides a display panel 10, including a flexible display panel body 100, including a flexible portion 130, and a first portion 110 and a second portion 120 connected to opposite sides of the flexible portion 130; and a hinge 200, including a fixed bracket 210, a support mechanism 220, and a rotary mechanism 230.

The support mechanism 220 includes a first support member 221, a second support member 222, a third support member 223, and a fourth support member 224. When the support mechanism 220 is in a flat state, the flexible portion 130 is in a flat state, the first support member 221, the second support member 222, the third support member 223, and the fourth support member 224 jointly support the first portion 110, the second portion 120, and the flexible portion 130.

Figure 5:
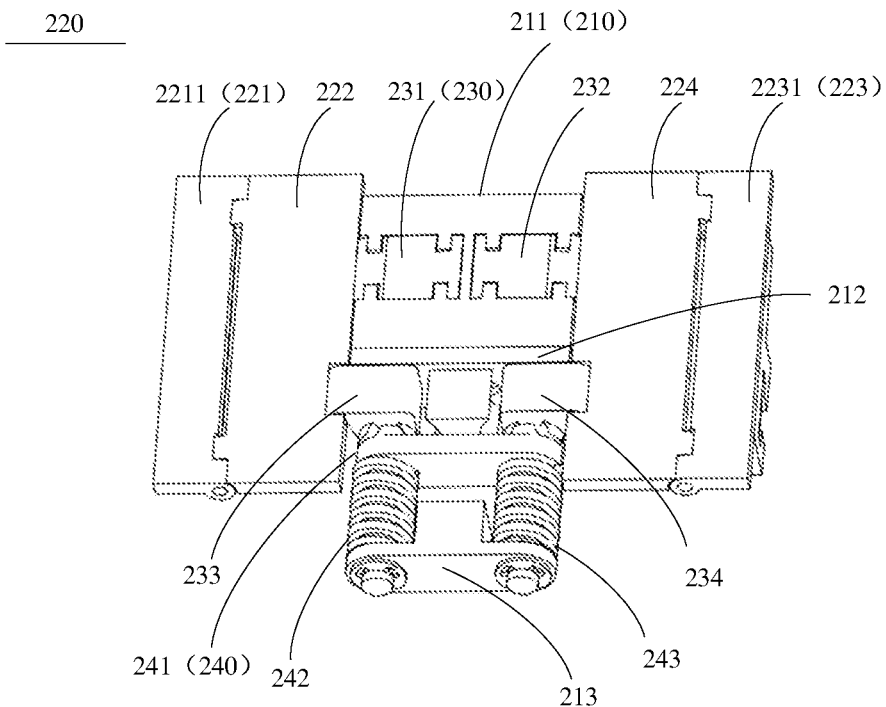
FIG. 5 is a schematic diagram of a hinge of a display panel in an unfolded state according to an embodiment of the present disclosure.
Figure 6:
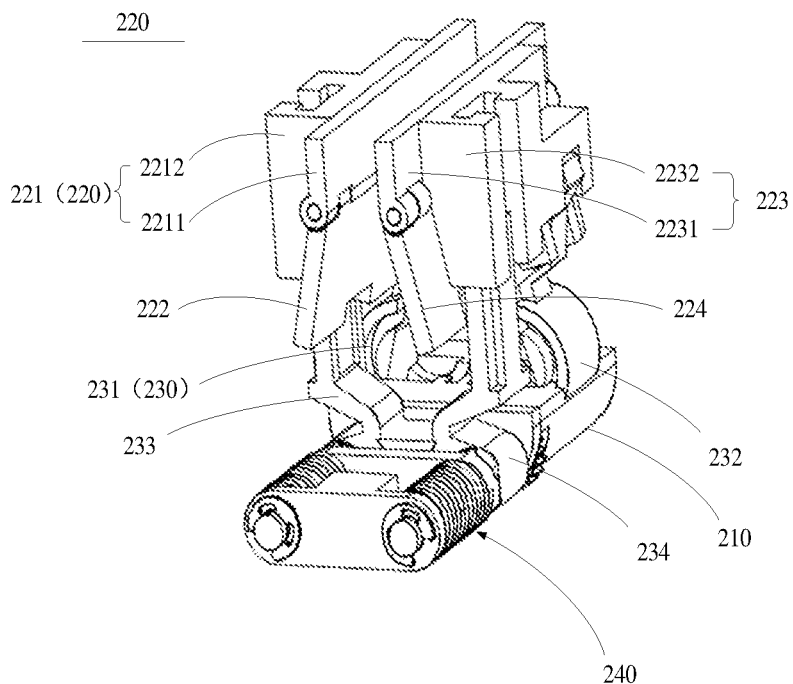
FIG. 6 is a schematic diagram of a hinge of a display panel in a fully folded state according to an embodiment of the present disclosure.
Figure 7:
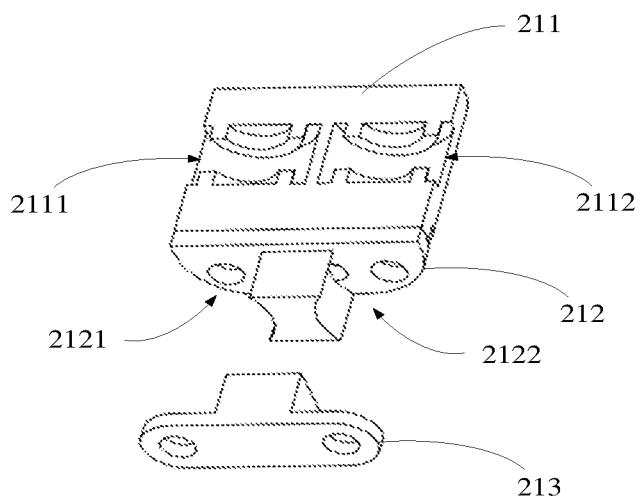
FIG. 7 is a schematic diagram of a fixed bracket of a hinge of a display panel according to an embodiment of the present disclosure.
Figure 8:
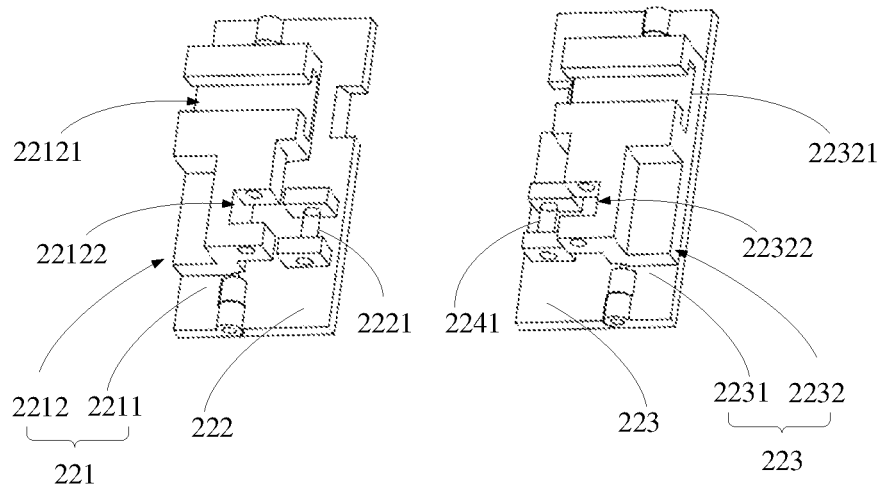
FIG. 8 is a schematic diagram of a support mechanism of a hinge of a display panel according to an embodiment of the present disclosure.
Figure 9:
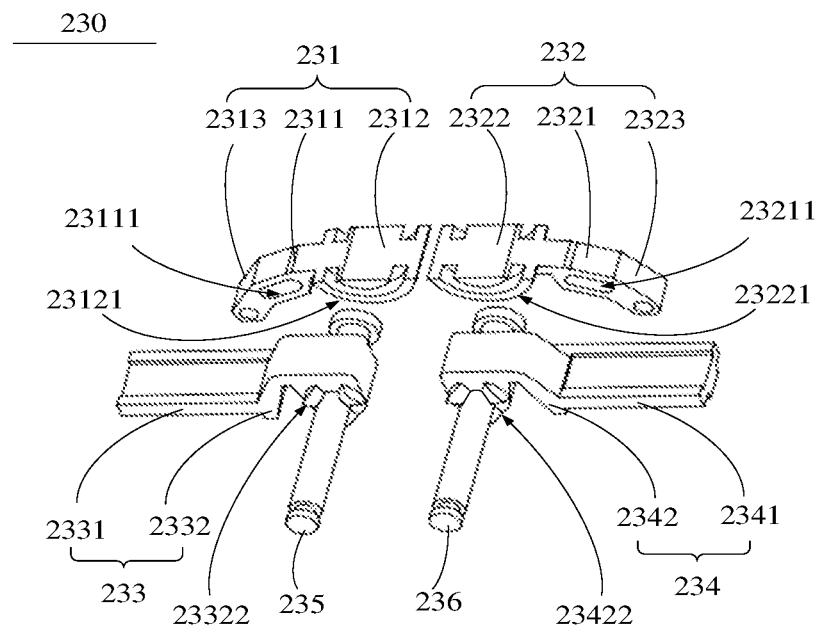
FIG. 9 is a schematic diagram of a rotary mechanism of a hinge of a display panel according to an embodiment of the present disclosure.
Figure 10:
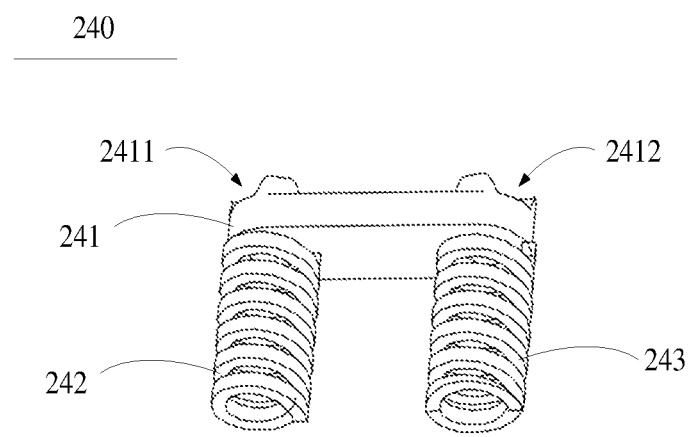
FIG. 10 is a schematic diagram of a positioning mechanism of a hinge of a display panel according to an embodiment of the present disclosure.

Referring to FIG. 4 to FIG. 9, FIG. 4 is an exploded schematic diagram of a hinge of a display panel according to an embodiment of the present disclosure; FIG. 5 is a schematic diagram of a hinge of a display panel in an unfolded state according to an embodiment of the present disclosure; FIG. 6 is a schematic diagram of a hinge of a display panel in a fully folded state according to an embodiment of the present disclosure; FIG. 7 is a schematic diagram of a fixed bracket of a hinge of a display panel according to an embodiment of the present disclosure; FIG. 8 is a schematic diagram of a support mechanism of a hinge of a display panel according to an embodiment of the present disclosure; and FIG. 9 is a schematic diagram of a rotary mechanism of a hinge of a display panel according to an embodiment of the present disclosure.

In this embodiment, the rotary mechanism 230 includes a first connection member 231, a second connection member 232, a third connection member 233, and a fourth connection member 234. The first connection member 231 is rotatably connected to one side of the fixed bracket 210 along a first shaft (not shown in the figure), and the second connection member 232 is rotatably connected to one side of the fixed bracket 210 away from the first connection member 231 along a second shaft (not shown in the figure). The first support member 221 is rotatably connected to the first connection member 231. The second support member 222 is arranged between the first connection member 231 and the first support member 221, one end of the second support member 222 is rotatably connected to the first support member 221, and the other end of the second support member 222 is slidably connected to the first connection member 231. One end of the third connection member 233 is rotatably connected to the fixed bracket 210 along a third shaft 235, and the other end of the third connection member 233 is slidably connected to the first support member 221. The third support member 223 is rotatably connected to the second connection member 232. The fourth support member 224 is arranged between the second connection member 232 and the third support member 223, one end of the fourth support member 224 is rotatably connected to the third support member 223, and the other end of the fourth support member 224 is slidably connected to the second connection member 232. One end of the fourth connection member 234 is rotatably connected to the fixed bracket 210 along a fourth shaft 236, and the other end of the fourth connection member 234 is slidably connected to the third support member 223.

It should be noted that, materials of the first connection member 231, the second connection member 232, the third connection member 233, the fourth connection member 234, the first support member 221, the second support member 222, the third support member 223, and the fourth support member 224 include but are not limited to steel. In addition, the first shaft, the second shaft, the third shaft 235, and the fourth shaft 236 may all be virtual shafts or physical shafts. The second shaft and the first shaft are not on the same axis, and the fourth shaft 236 and the third shaft 235 are not on the same axis. This is not specifically limited in this embodiment.

In this embodiment, the first connection member 231 includes a first body portion 2311, a first extension portion 2312 extending from one end of the first body portion 2311, and a second extension portion 2313 extending from the other end of the first body portion 2311. The first body portion 2311 is slidably connected to the second support member 222, the first extension portion 2312 is rotatably connected to the fixed bracket 210 around the first shaft, and the second extension portion 2313 is rotatably connected to the first support member 221. The first body portion 2311 includes a first sliding groove 23111, and the second support member 222 includes a first slider 2221 slidably connected in the first sliding groove 23111. It can be understood that, in an embodiment, the first slider 2221 may be of an axle pin structure. This is not specifically limited in this embodiment.

The second connection member 232 includes a second body portion 2321, a third extension portion 2322 extending from one end of the second body portion 2321, and a fourth extension portion 2323 extending from the other end of the second body portion 2321. The second body portion 2321 is slidably connected to the fourth support member 224, the third extension portion 2322 is rotatably connected to the fixed bracket 210 around the second shaft, and the fourth extension portion 2323 is rotatably connected to the third support member 223. The second body portion 2321 includes a second sliding groove 23211, and the fourth support member 224 includes a second slider 2241 slidably connected in the second sliding groove 23211. It can be understood that, in an embodiment, the second slider 2241 may be of an axle pin structure. This is not specifically limited in this embodiment.

In this embodiment, the first support member 221 and the second support member 222 are both sleeved on a first rotation shaft (not shown in the figure), and the third support member 223 and the fourth support member 224 are both sleeved on a second rotation shaft (not shown in the figure). The first support member 221 is rotatably connected to the second support member 222 through the first rotation shaft, and the third support member 223 is rotatably connected to the fourth support member 224 through the second rotation shaft. Specifically, the first rotation shaft and the second rotation shaft both include but are not limited to a pin shaft.

It can be understood that, that the first support member 221 is rotatably connected to the second support member 222 through the first rotation shaft, and the third support member 223 is rotatably connected to the fourth support member 224 through the second rotation shaft is only used for illustration. This is not specifically limited in this embodiment.

In this embodiment, the first support member 221 is rotatably connected to the first connection member 231. The second support member 222 is arranged between the first connection member 231 and the first support member 221, and one end of the second support member 222 is rotatably connected to the first support member 221. The first support member 221 is movably connected to the second support member 222 through the first rotation shaft, and the other end of the second support member 222 is slidably connected to the first connection member 231. The third support member 223 is rotatably connected to the second connection member 232. The fourth support member 224 is arranged between the second connection member 232 and the third support member 223, and one end of the fourth support member 224 is rotatably connected to the third support member 223. The third support member 223 is movably connected to the fourth support member 224 through the first rotation shaft, and the other end of the fourth support member 224 is slidably connected to the second connection member 232. Therefore, the number of degrees of freedom of rotation in the hinge 200 is increased, so that when the display panel 10 is in a fully folded state, the support mechanism 220 can be fully closed, and the flexible display panel body 100 in the display panel 10 can be fully closed and fully unfolded during folding.

In this embodiment, the first support member 221 includes a first support portion 2211, and a first mounting portion 2212 fixedly connected to the first support portion 2211. The first support portion 2211 is rotatably connected to the second support member 222. The first mounting portion 2212 is rotatably connected to the first connection member 231, and the first mounting portion 2212 is slidably connected to the third connection member 233. The third support member 223 includes a second support portion 2231, and a second mounting portion 2232 fixedly connected to the second support portion 2231. The second support portion 2231 is rotatably connected to the fourth support member 224. The second mounting portion 2232 is rotatably connected to the second connection member 232, and the second mounting portion 2232 is slidably connected to the fourth connection member 234.

It can be understood that, the first support portion 2211 may be rotatably connected to the second support member 222 through the first rotation shaft. The first support portion 2211 and the first mounting portion 2212 may be of an integrally formed structure, or may be fixedly connected through a fixing member. The second support portion 2231 may be rotatably connected to the fourth support member 224 through the second rotation shaft. The second support portion 2231 and the second mounting portion 2232 may be of an integrally formed structure, or may be fixedly connected through a fixing member. This is not specifically limited in this embodiment.

Specifically, the first mounting portion 2212 is provided with a third sliding groove 22121 and a first groove 22122, and the second mounting portion 2232 is provided with a fourth sliding groove 22321 and a second groove 22322. The second extension portion 2313 of the first connection member 231 is rotatably mounted in the first groove 22122. The other end of the third connection member 233 is slidably mounted in the third sliding groove 22121 of the first mounting portion 2212. The fourth extension portion 2323 of the second connection member 232 is rotatably mounted in the second groove 22322. The other end of the fourth connection member 234 is slidably mounted in the fourth sliding groove 22321 of the second mounting portion 2232.

In this embodiment, the third connection member 233 includes a third body portion 2331, and a fifth extension portion 2332 extending from one end of the third body portion 2331, and the fourth connection member 234 includes a fourth body portion 2341, and a sixth extension portion 2342 extending from one end of the fourth body portion 2341. The third body portion 2331 is slidably connected in the third sliding groove 22121 of the first mounting portion 2212, and the fifth extension portion 2332 is provided with a first hole 23321 for the third shaft 235 to pass through. The fourth body portion 2341 is slidably mounted in the fourth sliding groove 22321 of the second mounting portion 2232, and the sixth extension portion 2342 is provided with a second hole 23421 for the fourth shaft 236 to pass through.

In this embodiment, the third shaft 235 is rotatably connected to the fixed bracket 210, the fifth extension portion 2332 of the third connection member 233 is connected to the third shaft 235, the fourth shaft 236 is rotatably connected to the fixed bracket 210, and the sixth extension portion 2342 of the fourth connection member 234 is connected to the fourth shaft 236. Specifically, an axis of the first shaft is collinear with an axis of the third shaft 235, and an axis of the second shaft is collinear with an axis of the fourth shaft 236.

It can be understood that, in an embodiment, the third shaft 235 is fixedly connected to the fixed bracket 210, the fifth extension portion 2332 of the third connection member 233 is rotatably connected to the third shaft 235, the fourth shaft 236 is fixedly connected to the fixed bracket 210, and the sixth extension portion 2342 of the fourth connection member 234 is rotatably connected to the fourth shaft 236.

It can be learned from the above content that, the third connection member 233 and the third shaft 235 may be fixedly connected or movably connected, and the fourth connection member 234 and the fourth shaft 236 may be fixedly connected or movably connected. This is not specifically limited in this embodiment. In addition, it should be noted that, the third shaft 235 and the fourth shaft 236 include but are not limited to a gear shaft.

Specifically, in this embodiment, the following examples are used for illustration: The fifth extension portion 2332 of the third connection member 233 is rotatably connected to the fixed bracket 210 through the third shaft 235, the third body portion 2331 of the third connection member 233 is slidably connected in the third sliding groove 22121 of the first mounting portion 2212, the sixth extension portion 2342 of the fourth connection member 234 is rotatably connected to the fixed bracket 210 through the fourth shaft 236, and the fourth body portion 2341 of the fourth connection member 234 is slidably connected in the fourth sliding groove 22321 of the second mounting portion 2232.

It should be noted that, the fifth extension portion 2332 of the third connection member 233 may be slidably connected to the first support member 221 through cooperation of a pin shaft and a sliding groove, and the sixth extension portion 2342 of the fourth connection member 234 may be slidably connected to the third support member 223 through cooperation of a pin shaft and a sliding groove. It can be understood that, in this embodiment, the manner for the third connection member 233 to be slidably connected to the first support member 221, and the manner for the fourth connection member 234 to be slidably connected to the third support member 223 are only used for illustration. This is not specifically limited in this embodiment.

Referring to FIG. 6 to FIG. 9, in this embodiment, the fixed bracket 210 includes a body bracket 211, a first bracket 212, and a second bracket 213. The third shaft 235 and the fourth shaft 236 are rotatably connected to the body bracket 211. The first bracket 212 and the second bracket 213 are sleeved on the third shaft 235 and the fourth shaft 236, and the first bracket 212 is provided with a first depression 2121 and a second depression 2122. The first extension portion 2312 is rotatably received in the first depression 2121, and the second extension portion 2313 is rotatably received in the second depression 2122.

It should be noted that, materials of the body bracket 211, the first bracket 212, and the second bracket 213 include but are not limited to steel. This is not specifically limited in this embodiment.

In this embodiment, the body bracket 211 includes an arc-shaped sliding groove (not marked in the figure), the first extension portion 2312 of the first connection member 231 includes a third slider 23121, and the third extension portion 2322 of the second connection member 232 includes a fourth slider 23221. The third slider 23121 and the fourth slider 23221 rotate in the arc-shaped sliding groove.

Further, the body bracket 211 includes a first circular arc sliding groove 2111 and a second circular arc sliding groove 2112, and bottoms of the third slider 23121 and the fourth slider 23221 are both of a circular arc structure. The third slider 23121 cooperates with the first circular arc sliding groove 2111, and the fourth slider 23221 cooperates with the second circular arc sliding groove 2112. A change in a relative position relationship between the third slider 23121 and the fourth slider 23221 drives a change in a relative position relationship between the first connection member 231 and the second connection member 232.

It can be understood that, in this embodiment, because the first circular arc sliding groove 2111 and the second circular arc sliding groove 2112 limit rotation directions of the third slider 23121 and the fourth slider 23221, an unnecessary movement trajectory generated when the first connection member 231 and the second connection member 232 rotate is avoided.

It should be noted that, the body bracket 211 includes an arc-shaped sliding groove, the first extension portion 2312 of the first connection member 231 includes the third slider 23121, and the third extension portion 2322 of the second connection member 232 includes the fourth slider 23221. That the third slider 23121 and the fourth slider 23221 rotate in the arc-shaped sliding groove is only used for illustration, and rotatable connection manners of the body bracket 211, the first connection member 231, and the second connection member 232 are not limited in this embodiment. Likewise, that the body bracket 211 includes a first circular arc sliding groove 2111 and a second circular arc sliding groove 2112, and bottoms of the third slider 23121 and the fourth slider 23221 are both of a circular arc structure is only used for illustration. This is not specifically limited in this embodiment.

Referring to FIG. 3, in this embodiment, when the support mechanism 220 is in a fully folded state, the flexible portion 130 is in a bent state, the second support member 222 and the fourth support member 224 are arranged opposite to each other and respectively support opposite ends of the flexible portion 130, the first support member 221 and the third support member 223 are arranged opposite to each other and respectively support the first portion 110 and the second portion 120, the first connection member 231 and the second connection member 232 are arranged opposite to each other, the first connection member 231 is parallel and coplanar with the second support member 222, and the second connection member 232 is parallel and coplanar with the fourth support member 224. In a direction along the first support member 221 and the third support member 223 toward the fixed bracket 210, a distance between the second support member 222 and the fourth support member 224 gradually increases, so that a first angle is formed between the opposite ends of the flexible portion 130, the first angle is an acute angle, and a distance between the first support member 221 and the third support member 223 is less than or equal to the distance between the second support member 222 and the fourth support member 224. Therefore, a second angle is formed between the first portion 110 and the second portion 120, the second angle is an acute angle or a 0° angle, and the second angle is less than the first angle.

It can be understood that, as shown in FIG. 1, in this embodiment, when the display panel is in an unfolded state, an angle of about 180 degrees is formed between the second support member 222, the first connection member 231, the first support member 221, the third support member 223, the second connection member 232, and the fourth support member 224, so that at least a part of the first portion 110 and the second portion 120 of the flexible display panel body 100 can be on the same plane as the flexible portion 130, and the flexible portion 130 is in a flat state. In actual application, a mode in which the flexible display panel is in an unfolded and flat state may be used as a tablet mode of the display panel for the display panel to obtain a largest display area.

When the display panel 10 switches from a state shown in FIG. 1 to a state shown in FIG. 2, the transitional folded state may refer to a state in which the flexible display panel body 100 is between the fully folded state and the unfolded state, and a transitional folded state in which the flexible display panel body 100 is in a 90° bent state is used for illustration in this embodiment.

In this case, the first connection member 231 rotates on one side of the fixed bracket 210 along the first shaft. Because the second extension portion 2313 of the first connection member 231 is rotatably mounted in the first groove 22122 of the first mounting portion 2212 of the first support member 221, the first support member 221 rotates together with the first connection member 231. Because the first slider 2221 of the second support member 222 is slidably connected in the first sliding groove 23111 of the first connection member 231, the second support member 222 rotates together with the first connection member 231 through the first slider 2221. The first support portion 2211 of the first support member 221 is rotatably connected to the second support member 222 through the first rotation shaft.

The second connection member 232 rotates on the other side of the fixed bracket 210 along the second shaft. Because the fourth extension portion 2323 of the second connection member 232 is rotatably mounted in the first groove 22122 of the second mounting portion 2232 of the third support member 223, the third support member 223 rotates together with the second connection member 232. Because the second slider 2242 of the fourth support member 224 is slidably connected in the second sliding groove 23211 of the second connection member 232, the fourth support member 224 rotates together with the second connection member 232 through the second slider 2242. The second support portion 2231 of the third support member 223 is rotatably connected to the fourth support member 224 through the second rotation shaft, so that an approximate 90° angle is formed between the first support member 221 and the second support member 222 and front sides of the third support member 223 and the fourth support member 224.

When the display panel 10 is switched from the state shown in FIG. 2 to a state shown in FIG. 3, that is, when the display panel 10 is in a fully folded state, a wedge shape is formed by inclination of the first connection member 231, the first support member 221, the second support member 222, the second connection member 232, the third support member 223, and the fourth support member 224. The second support member 222 and the fourth support member 224 are arranged opposite to each other and respectively support opposite ends of the flexible portion 130, the first support member 221 and the third support member 223 are arranged opposite to each other and respectively support the first portion 110 and the second portion 120, the first connection member 231 is parallel and coplanar with the second support member 222, and the second connection member 232 is parallel and coplanar with the fourth support member 224. A first angle is formed between the opposite ends of the flexible portion 130, a second angle is formed between the first portion 110 and the second portion 120, and the first angle is greater than the second angle. Therefore, the room for accommodating the flexible display panel body 100 is increased, so that when the flexible display panel body 100 is in the fully folded state, a larger arc (such as a drop shape) for bending can be adopted, which improves the folding of the flexible display panel body 100, and avoids causing damage to the flexible display panel body 100 due to excessively small folding.

Referring to FIG. 4 to FIG. 10, FIG. 10 is a schematic diagram of a positioning mechanism of a hinge of a display panel according to an embodiment of the present disclosure.

In this embodiment, the hinge 200 further includes a positioning mechanism 240, and the positioning mechanism 240 includes a positioning member 241. The positioning member 241 is sleeved on the third shaft 235 and the fourth shaft 236, the positioning member 241 includes a first protrusion 2411 toward the fifth extension portion 2332 of the third connection member 233 and a second protrusion 2412 toward the sixth extension portion 2342 of the fourth connection member 234. The fifth extension portion 2332 of the third connection member 233 is provided with a third groove 23322, and the sixth extension portion 2342 of the fourth connection member 234 is provided with a fourth groove 23422. When the support mechanism 220 is in the flat state or the fully folded state, the first protrusion 2411 is received in the third groove 23322, and the second protrusion 2412 is received in the fourth groove 23422.

The positioning mechanism 240 further includes a first elastic member 242 and a second elastic member 243. The first elastic member 242 is sleeved on the third shaft 235, one end of the first elastic member 242 is connected to the positioning member 241, and the other end of the first elastic member 242 is connected to the second bracket 213. The second elastic member 243 is sleeved on the fourth shaft 236, one end of the second elastic member 243 is connected to the positioning member 241, and the other end of the second elastic member 243 is connected to the second bracket 213. When the support mechanism 220 is in the fully folded state or the flat state, the first elastic member 242 and the second elastic member 243 are both in an elastic deformation state.

In this embodiment, when the third connection member 233 rotates, the third groove 23322 rotates accordingly, and the first protrusion 2411 is received in the third groove 23322; and when the fourth connection member 234 rotates, the fourth groove 23422 rotates, the second protrusion 2412 is received in the fourth groove 23422, and the third connection member 233, the fourth connection member 234, and the positioning member 241 switch to a preset cooperation state.

Specifically, the positioning member 241 may include one first protrusion 2411 and one second protrusion 2412. The third connection member 233 includes a plurality of the third grooves 23322, and the fourth connection member 234 may include a plurality of the fourth grooves 23422, so that when the first protrusion 2411 is received in the third groove 23322 at a different position, and when the second protrusion 2412 is received in the fourth groove 23422 at a different position, the hinge 200 can be maintained in different fully folded states when the hinge 200 is folded. For example, the third connection member 233 and the fourth connection member 234 can be maintained at a position with an angle of 30°, 45°, 60° or 90° relative to a horizontal plane.

It should be noted that, in this embodiment, when the third connection member 233 and the fourth connection member 234 rotate, the first protrusion 2411 and the third groove 23322 engage with each other, and the second protrusion 2412 and the fourth groove 23422 engage with each other. Therefore, the positioning member 241 is pushed to move toward a direction away from the rotary mechanism 230, and the first elastic member 242 and the second elastic member 243 are compressed. When the first elastic member 242 and the second elastic member 243 in the compressed state recover from deformation, a force is provided for the positioning member 241 to move toward a direction close to the rotary mechanism 230, which accelerates the engagement of the first protrusion 2411 and the third groove 23322, and the engagement of the second protrusion 2412 and the fourth groove 23422. That is, in this embodiment, a required force can be controlled by setting parameters of the first elastic member 242 and the second elastic member 243 for the hinge 200 to achieve a parking function under different angles.

It can be understood that, that the positioning member 241 may include one first protrusion 2411 and one second protrusion 2412, the third connection member 233 includes a plurality of third grooves 23322, and the fourth connection member 234 may include a plurality of fourth grooves 23422 is only used for illustration. This is not limited in this embodiment.

It should be noted that, a material of the positioning member 241 includes but is not limited to steel, and the first elastic member 242 and the second elastic member 243 include but are not limited to a spring. This is not specifically limited in this embodiment.

Figure 11:
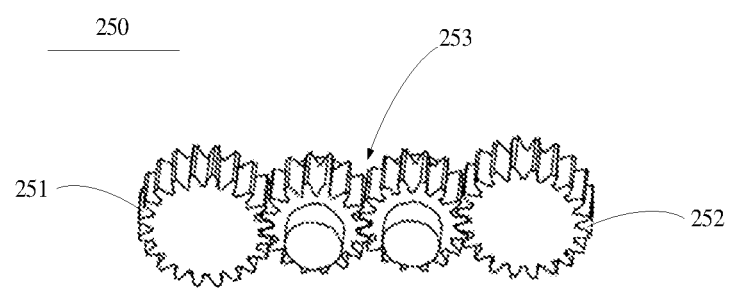
FIG. 11 is a schematic diagram of a synchronization mechanism of a hinge of a display panel according to an embodiment of the present disclosure.

Referring to FIG. 11, FIG. 11 is a schematic diagram of a synchronization mechanism of a hinge of a display panel according to an embodiment of the present disclosure.

In this embodiment, the display panel 10 further includes a synchronization mechanism 250. The synchronization mechanism 250 includes a first synchronization member 251, a second synchronization member 252, and a third synchronization member 253. The first synchronization member 251 is connected to the third shaft 235, the second synchronization member 252 is connected to the fourth shaft 236, and the first synchronization member 251 is synchronously connected to the second synchronization member 252 through the third synchronization member 253 to enable synchronous rotation of the third shaft 235 and the fourth shaft 236.

In this embodiment, the synchronization mechanism 250, the rotary mechanism 230, and the positioning mechanism 240 cooperate with each other, and through the synchronization mechanism 250 and the rotary mechanism 230, the first support member 221 and the second support member 222 can be respectively driven to synchronously rotate with the third support member 223 and the fourth support member 224 along the fixed bracket 210, which improves the consistency and stability of the motion of the support structure.

Further, through the synchronization mechanism 250 and the rotary mechanism 230, the third slider 23121 and the fourth slider 23221 can be respectively driven to rotate relative to the first circular arc sliding groove 2111 and the second circular arc sliding groove 2112 in the body bracket 211, so that the state of the hinge 200 is changed.

Specifically, the first synchronization member includes a first gear, the second synchronization member includes a second gear, and the third synchronization member includes two third gears meshing with each other. The two third gears are rotatably connected to the body bracket 211 and the first bracket 212. The first gear is sleeved on the second shaft, and the second gear is sleeved on the fourth shaft 236. The first gear meshes with one of the two third gears, and the second gear meshes with the other of the two third gear.

It should be noted that, that the first synchronization member includes a first gear, the second synchronization member includes a second gear, and the third synchronization member includes two third gears meshing with each other is only used for illustration. The type of the synchronization mechanism 250 is not specifically limited in this embodiment.

This embodiment further provides an electronic device, including any display panel 10 in the foregoing embodiments.

The display panel 10 has been described in detail with reference to the foregoing embodiments and is not repeated herein.

This embodiment further provides a hinge 200, which has been described in detail with reference to the foregoing embodiment and is not repeated herein.

The present disclosure discloses a hinge, a display panel, and an electronic device. The flexible display panel body 100 includes a flexible portion, and a first portion and a second portion connected to opposite sides of the flexible portion. The hinge includes a fixed bracket, a support mechanism, and a rotary mechanism. The support mechanism includes a first support member, a second support member, a third support member and a fourth support member. The rotary mechanism includes a first connection member, a second connection member, a third connection member, and a fourth connection member. When the support mechanism is in a fully folded state, the second support member and the fourth support member are arranged opposite to each other and respectively support the opposite ends of the flexible portion, the first support member and the third support member are arranged opposite to each other and respectively support the first portion and the second portion, the first connection member and the second connection member are arranged opposite to each other and are respectively parallel and coplanar with the second support member and the fourth support member, a first angle is formed between the opposite ends of the flexible portion, a second angle is formed between the first portion and the second portion, and the first angle is greater than the second angle.

It can be understood that, a person skilled in the art can make equivalent replacements or changes according to the technical solution and the inventive concept of the present disclosure, and all the changes or replacements shall fall within the protection scope of the appended claims of the present disclosure.

What is claimed is:

1. A display panel, comprising:
    a flexible display panel body, comprising a flexible portion, and a first portion and a second portion connected to opposite sides of the flexible portion; and
    a hinge, comprising a fixed bracket, a support mechanism, and a rotary mechanism, wherein the support mechanism comprises a first support member, a second support member, a third support member, and a fourth support member, the rotary mechanism comprises a first connection member, a second connection member, a third connection member, and a fourth connection member, the first connection member is rotatably connected to one side of the fixed bracket along a first shaft, the second connection member is rotatably connected to one side of the fixed bracket away from the first connection member along a second shaft, the first support member is rotatably connected to the first connection member, the second support member is arranged between the first connection member and the first support member, one end of the second support member is rotatably connected to the first support member, the other end of the second support member is slidably connected to the first connection member, one end of the third connection member is rotatably connected to the fixed bracket along a third shaft, the other end of the third connection member is slidably connected to the first support member, the third support member is rotatably connected to the second connection member, the fourth support member is arranged between the second connection member and the third support member, one end of the fourth support member is rotatably connected to the third support member, the other end of the fourth support member is slidably connected to the second connection member, one end of the fourth connection member is rotatably connected to the fixed bracket along a fourth shaft, and the other end of the fourth connection member is slidably connected to the third support member, wherein
    when the support mechanism is in a fully folded state, the flexible portion is in a bent state, the second support member and the fourth support member are arranged opposite to each other and respectively support opposite ends of the flexible portion, the first support member and the third support member are arranged opposite to each other and respectively support the first portion and the second portion, the first connection member and the second connection member are arranged opposite to each other and are respectively parallel and coplanar with the second support member and the fourth support member, a first angle is formed between the opposite ends of the flexible portion, a second angle is formed between the first portion and the second portion, and the first angle is greater than the second angle.

2. The display panel as claimed in claim 1, wherein when the support mechanism is in a flat state, the flexible portion is in a flat state, and the first support member, the second support member, the third support member, and the fourth support member jointly support the first portion, the second portion, and the flexible portion.

3. The display panel as claimed in claim 2, wherein when the support mechanism is in the fully folded state, and in a direction along the first support member and the third support member toward the fixed bracket, a distance between the opposite ends of the flexible portion gradually increases, and the second angle is less than the first angle.

4. The display panel as claimed in claim 3, wherein the first connection member comprises a first body portion, a first extension portion extending from one end of the first body portion, and a second extension portion extending from the other end of the first body portion, the first body portion is slidably connected to the second support member, the first extension portion is rotatably connected to the fixed bracket around the first shaft, the second extension portion is rotatably connected to the first support member, the first body portion comprises a first sliding groove, and the second support member comprises a first slider slidably connected in the first sliding groove; and
    the second connection member comprises a second body portion, a third extension portion extending from one end of the second body portion, and a fourth extension portion extending from the other end of the second body portion, the second body portion is slidably connected to the fourth support member, the third extension portion is rotatably connected to the fixed bracket around the second shaft, the fourth extension portion is rotatably connected to the third support member, the second body portion comprises a second sliding groove, and the fourth support member comprises a second slider slidably connected in the second sliding groove.

5. The display panel as claimed in claim 4, wherein the first support member comprises a first support portion and a first mounting portion fixedly connected to the first support portion, the first support portion is rotatably connected to the second support member, the first mounting portion is rotatably connected to the first connection member, and the first mounting portion is slidably connected to the third connection member; and the third support member comprises a second support portion and a second mounting portion fixedly connected to the second support portion, the second support portion is rotatably connected to the fourth support member, the second mounting portion is rotatably connected to the second connection member, and the second mounting portion is slidably connected to the fourth connection member.

6. The display panel as claimed in claim 5, wherein the first mounting portion is provided with a third sliding groove and a first groove, and the second mounting portion is provided with a fourth sliding groove and a second groove; and the second extension portion of the first connection member is rotatably mounted in the first groove, the other end of the third connection member is slidably mounted in the third sliding groove of the first mounting portion, the fourth extension portion of the second connection member is rotatably mounted in the second groove, and the other end of the fourth connection member is slidably mounted in the fourth sliding groove of the second mounting portion.

7. The display panel as claimed in claim 6, wherein the third connection member comprises a third body portion and a fifth extension portion extending from one end of the third body portion, and the fourth connection member comprises a fourth body portion and a sixth extension portion extending from one end of the fourth body portion; the third body portion is slidably connected in the third sliding groove of the first mounting portion, the fifth extension portion is provided with a first hole for the third shaft to pass through, the fourth body portion is slidably mounted in the fourth sliding groove of the second mounting portion, and the sixth extension portion is provided with a second hole for the fourth shaft to pass through.

8. The display panel as claimed in claim 7, wherein the third shaft is fixedly connected to the fixed bracket, the fifth extension portion of the third connection member is rotatably connected to the third shaft, the fourth shaft is fixedly connected to the fixed bracket, and the sixth extension portion of the fourth connection member is rotatably connected to the fourth shaft.

9. The display panel as claimed in claim 7, wherein the third shaft is rotatably connected to the fixed bracket, the fifth extension portion of the third connection member is connected to the third shaft, the fourth shaft is rotatably connected to the fixed bracket, and the sixth extension portion of the fourth connection member is connected to the fourth shaft.

10. The display panel as claimed in claim 9, wherein the fixed bracket comprises a body bracket, a first bracket, and a second bracket, the third shaft and the fourth shaft are rotatably connected to the body bracket, the first bracket and the second bracket are sleeved on the third shaft and the fourth shaft, the first bracket is located between the second bracket and the body bracket, the first bracket is provided with a first depression and a second depression, the fifth extension portion is rotatably received in the first depression, and the sixth extension portion is rotatably received in the second depression.

11. The display panel as claimed in claim 10, wherein the hinge further comprises a positioning mechanism, the positioning mechanism comprises a positioning member, the positioning member is sleeved on the third shaft and the fourth shaft, the positioning member comprises a first protrusion toward the fifth extension portion of the third connection member and a second protrusion toward the sixth extension portion of the fourth connection member, the fifth extension portion of the third connection member is provided with a third groove, the sixth extension portion of the fourth connection member is provided with a fourth groove, and when the support mechanism is in the flat state or the fully folded state, the first protrusion is received in the third groove, and the second protrusion is received in the fourth groove.

12. The display panel as claimed in claim 11, wherein the positioning mechanism further comprises a first elastic member and a second elastic member, the first elastic member is sleeved on the third shaft, one end of the first elastic member is connected to the positioning member, the other end of the first elastic member is connected to the second bracket, the second elastic member is sleeved on the fourth shaft, one end of the second elastic member is connected to the positioning member, the other end of the second elastic member is connected to the second bracket, and when the support mechanism is in the fully folded state or the flat state, the first elastic member and the second elastic member are both in an elastic deformation state.

13. The display panel as claimed in claim 12, wherein the display panel further comprises a synchronization mechanism, the synchronization mechanism comprises a first synchronization member, a second synchronization member, and a third synchronization member, the first synchronization member is connected to the third shaft, the second synchronization member is connected to the fourth shaft, and the first synchronization member is synchronously connected to the second synchronization member through the third synchronization member to enable synchronous rotation of the third shaft and the fourth shaft.

14. The display panel as claimed in claim 13, wherein the first synchronization member comprises a first gear, the second synchronization member comprises a second gear, the third synchronization member comprises two third gears meshing with each other, the two third gears are rotatably connected to the body bracket and the first bracket, the first gear is sleeved on the third shaft, the second gear is sleeved on the fourth shaft, the first gear meshes with one of the two third gears, and the second gear meshes with the other one of the two third gears.

15. An electronic device, comprising a display panel, wherein the display panel comprises:

a flexible display panel body, comprising a flexible portion, and a first portion and a second portion connected to opposite sides of the flexible portion; and a hinge, comprising a fixed bracket, a support mechanism, and a rotary mechanism, wherein the support mechanism comprises a first support member, a second support member, a third support member, and a fourth support member, the rotary mechanism comprises a first connection member, a second connection member, a third connection member, and a fourth connection member, the first connection member is rotatably connected to one side of the fixed bracket along a first shaft, the second connection member is rotatably connected to one side of the fixed bracket away from the first connection member along a second shaft, the first support member is rotatably connected to the first connection member, the second support member is arranged between the first connection member and the first support member, one end of the second support member is rotatably connected to the first support member, the other end of the second support member is slidably connected to the first connection member, one end of the third connection member is rotatably connected to the fixed bracket along a third shaft, the other end of the third connection member is slidably connected to the first support member, the third support member is rotatably connected to the second connection member, the fourth support member is arranged between the second connection member and the third support member, one end of the fourth support member is rotatably connected to the third support member, the other end of the fourth support member is slidably connected to the second connection member, one end of the fourth connection member is rotatably connected to the fixed bracket along a fourth shaft, and the other end of the fourth connection member is slidably connected to the third support member, wherein when the support mechanism is in a fully folded state, the flexible portion is in a bent state, the second support member and the fourth support member are arranged opposite to each other and respectively support opposite ends of the flexible portion, the first support member and the third support member are arranged opposite to each other and respectively support the first portion and the second portion, the first connection member and the second connection member are arranged opposite to each other and are respectively parallel and coplanar with the second support member and the fourth support member, a first angle is formed between the opposite ends of the flexible portion, a second angle is formed between the first portion and the second portion, and the first angle is greater than the second angle.

16. The electronic device as claimed in claim 15, wherein when the support mechanism is in a flat state, the flexible portion is in a flat state, and the first support member, the second support member, the third support member, and the fourth support member jointly support the first portion, the second portion, and the flexible portion.

17. The electronic device as claimed in claim 16, wherein when the support mechanism is in the fully folded state, and in a direction along the first support member and the third support member toward the fixed bracket, a distance between the opposite ends of the flexible portion gradually increases, and the second angle is less than the first angle.

18. The electronic device as claimed in claim 17, wherein the first connection member comprises a first body portion, a first extension portion extending from one end of the first body portion, and a second extension portion extending from the other end of the first body portion, the first body portion is slidably connected to the second support member, the first extension portion is rotatably connected to the fixed bracket around the first shaft, the second extension portion is rotatably connected to the first support member, the first body portion comprises a first sliding groove, and the second support member comprises a first slider slidably connected in the first sliding groove; and the second connection member comprises a second body portion, a third extension portion extending from one end of the second body portion, and a fourth extension portion extending from the other end of the second body portion, the second body portion is slidably connected to the fourth support member, the third extension portion is rotatably connected to the fixed bracket around the second shaft, the fourth extension portion is rotatably connected to the third support member, the second body portion comprises a second sliding groove, and the fourth support member comprises a second slider slidably connected in the second sliding groove.

19. The electronic device as claimed in claim 18, wherein the first support member comprises a first support portion and a first mounting portion fixedly connected to the first support portion, the first support portion is rotatably connected to the second support member, the first mounting portion is rotatably connected to the first connection member, and the first mounting portion is slidably connected to the third connection member; and the third support member comprises a second support portion and a second mounting portion fixedly connected to the second support portion, the second support portion is rotatably connected to the fourth support member, the second mounting portion is rotatably connected to the second connection member, and the second mounting portion is slidably connected to the fourth connection member.

20. A hinge, comprising:

a fixed bracket, a support mechanism, and a rotary mechanism, wherein the support mechanism comprises a first support member, a second support member, a third support member, and a fourth support member, the rotary mechanism comprises a first connection member, a second connection member, a third connection member, and a fourth connection member, the first connection member is rotatably connected to one side of the fixed bracket along a first shaft, the second connection member is rotatably connected to one side of the fixed bracket away from the first connection member along a second shaft, the first support member is rotatably connected to the first connection member, the second support member is arranged between the first connection member and the first support member, one end of the second support member is rotatably connected to the first support member, the other end of the second support member is slidably connected to the first connection member, one end of the third connection member is rotatably connected to the fixed bracket along a third shaft, the other end of the third connection member is slidably connected to the first support member, the third support member is rotatably connected to the second connection member, the fourth support member is arranged between the second connection member and the third support member, one end of the fourth support member is rotatably connected to the third support member, the other end of the fourth support member is slidably connected to the second connection member, one end of the fourth connection member is rotatably connected to the fixed bracket along a fourth shaft, and the other end of the fourth connection member is slidably connected to the third support member, wherein when the support mechanism is in a fully folded state, the second support member and the fourth support member are arranged opposite to each other, the first support member and the third support member are arranged opposite to each other, the first connection member and the second connection member are arranged opposite to each other and are respectively parallel and coplanar with the second support member and the fourth support member, a first angle is formed between the second support member and the fourth support member, a second angle is formed between the first support member and the second support member, and the second angle is less than the first angle.

* * * * *